United States Patent
Yang

(10) Patent No.: US 9,419,547 B2
(45) Date of Patent: *Aug. 16, 2016

(54) SWITCH TYPE DC ELECTRIC MACHINE HAVING AUXILIARY EXCITATION WINDING AND CONDUCTION RING AND BRUSH

(71) Applicant: Tai-Her Yang, Dzan-Hwa (TW)

(72) Inventor: Tai-Her Yang, Dzan-Hwa (TW)

(*) Notice: Subject to any disclaimer, the term of this patent is extended or adjusted under 35 U.S.C. 154(b) by 495 days.

This patent is subject to a terminal disclaimer.

(21) Appl. No.: 13/914,831

(22) Filed: Jun. 11, 2013

(65) Prior Publication Data
US 2013/0328519 A1 Dec. 12, 2013

Related U.S. Application Data

(63) Continuation-in-part of application No. 13/837,110, filed on Mar. 15, 2013, now Pat. No. 9,214,880, which is a continuation-in-part of application No. 13/493,126, filed on Jun. 11, 2012, now Pat. No. 9,035,524.

(51) Int. Cl.
*H02K 21/04* (2006.01)
*H02P 6/00* (2016.01)
*H02K 29/06* (2006.01)
*H02K 23/66* (2006.01)

(52) U.S. Cl.
CPC .............. *H02P 6/002* (2013.01); *H02K 21/042* (2013.01); *H02K 23/66* (2013.01); *H02K 29/06* (2013.01)

(58) Field of Classification Search
CPC ...... H02P 6/002; H02K 21/042; H02K 23/66; H02K 29/06
USPC .................................. 310/181, 180; 318/716
See application file for complete search history.

(56) References Cited

U.S. PATENT DOCUMENTS

| | | | | | |
|---|---|---|---|---|---|
| 1,646,821 | A | * | 10/1927 | Karapetoff | H02P 9/105 310/133 |
| 2,437,996 | A | * | 3/1948 | Carnegie | B66C 13/26 318/382 |
| 2,977,518 | A | * | 3/1961 | Kafka et al. | H02M 5/04 307/149 |
| 3,675,099 | A | * | 7/1972 | Johnston | H02P 23/08 318/378 |
| 3,750,000 | A | * | 7/1973 | Bruckner | H02P 8/32 318/400.09 |
| 3,831,075 | A | * | 8/1974 | Liska | G05D 3/183 318/596 |
| 3,883,633 | A | * | 5/1975 | Kohler | H02K 57/006 310/138 |
| 4,260,944 | A | * | 4/1981 | O'Mahony | H02K 16/02 310/111 |
| 4,412,794 | A | * | 11/1983 | Presley | H02K 41/06 310/82 |
| 4,532,458 | A | * | 7/1985 | Kuznetsov | H02P 5/74 318/111 |
| 4,577,139 | A | * | 3/1986 | Reinhardt | H02K 29/08 310/181 |
| 4,786,853 | A | * | 11/1988 | VanMaaren | H02P 9/46 322/47 |

(Continued)

*Primary Examiner* — Alex W Mok
(74) *Attorney, Agent, or Firm* — Bacon & Thomas, PLLC

(57) ABSTRACT

The present invention provides an auxiliary excitation winding set to be installed at the rotary part of the electric machine (104) composed of a rotary part of the permanent magnetic electric machine or a rotary part of the reluctance electric machine of the switched DC electric machine with conduction ring and brush (1000), and an electric conduction ring and brush device (107) is served as an interface for transmitting the electric power, thereby inputting the excitation electric power to the auxiliary excitation winding set; and through controlling the value and the polarity of excitation voltage and current, the magnetic pole of the rotary part of magnetmotive electric machine (104) of the switched DC electric machine with conduction ring and brush (1000) can be performed with the excitation effect of auxiliary excitation or differential excitation or auxiliary compound excitation or differential compound excitation.

7 Claims, 2 Drawing Sheets

(56) References Cited

U.S. PATENT DOCUMENTS

| | | | | |
|---|---|---|---|---|
| 5,179,308 A * | 1/1993 | Malsky | F16C 32/0459 | 310/90.5 |
| 5,915,070 A * | 6/1999 | Takekawa | H02P 27/08 | 318/440 |
| 6,373,204 B1 * | 4/2002 | Peterson | H02P 5/74 | 318/112 |
| 7,250,734 B1 * | 7/2007 | Iannello | H02K 19/103 | 310/168 |
| 7,859,200 B2 * | 12/2010 | Yang | H02K 17/36 | 310/195 |
| 7,915,778 B2 * | 3/2011 | Miyata | H02K 3/28 | 310/179 |
| 2002/0117934 A1 * | 8/2002 | Kanazawa | H02K 21/044 | 310/263 |
| 2002/0117935 A1 * | 8/2002 | Kanazawa | H02K 7/116 | 310/263 |
| 2010/0019701 A1 * | 1/2010 | Yang | H02K 17/36 | 318/49 |
| 2010/0148717 A1 * | 6/2010 | Yang | H02P 25/16 | 318/767 |
| 2013/0328518 A1 * | 12/2013 | Yang | H02K 21/042 | 318/716 |

* cited by examiner

SWITCH TYPE DC ELECTRIC MACHINE HAVING AUXILIARY EXCITATION WINDING AND CONDUCTION RING AND BRUSH

CROSS REFERENCE TO RELATED APPLICATION

This is a continuation-in part of application Ser. No. 13/837,110 filed on Mar. 15, 2013 which is a continuation-in part of application Ser. No. 13/493,126 filed on Jun. 11, 2012.

BACKGROUND OF THE INVENTION (a) Field of the Invention

The present invention provides a switch type DC electric machine having auxiliary excitation winding and conduction ring and brush in which a rotary part of electric machine (104) composed of a rotary part of permanent magnetic commutatorless switched electric machine or a rotary part of reluctance electric machine of the switched DC electric machine with conduction ring and brush (1000) is installed with a serial type auxiliary excitation winding set (105) and/or a parallel type auxiliary excitation winding set (108), and an electric conduction ring and brush device (107) is served as an interface for transmitting the electric power; a drive control device (103) is used for controlling the value and the polarity and the phase sequence of excitation current of a magnetic field winding set of electric machine (102), and also equipped with one or more than one of following functions, including: (A) controlling the value and the polarity of excitation voltage and current of the serial type auxiliary excitation winding set (105); (B) controlling the value and the polarity of excitation voltage and current of the parallel type auxiliary excitation winding set (108); (C) controlling the value and the polarity of excitation voltage and current of both or one of the serial type auxiliary excitation winding set (105) and/or the parallel type auxiliary excitation winding set (108);

With the control function provided by the mentioned drive control device (103), driven by the DC power source or DC power source rectified from the AC power source, when the switched DC electric machine with conduction ring and brush (1000) is operated as a motor or a power generator, the magnetic pole of the rotary part of electric machine (104) of the switched DC electric machine with conduction ring and brush (1000) can be performed with the excitation effect of auxiliary excitation or differential excitation through serial excitation, or auxiliary excitation or differential excitation through shunt excitation, or the excitation effect of auxiliary compound excitation or differential compound excitation.

(b) Description of the Prior Art

In a conventional permanent magnetic or reluctance switched DC brushless electric machine, the permanent magnetic or reluctance electric-mechanical unit of the electric machine is not equipped with a function of altering the characteristic along with the loaded current, therefore the application is limited.

SUMMARY OF THE INVENTION

The present invention provides an auxiliary excitation winding set to be installed at the rotary part of the electric machine (104) composed of a rotary part of the permanent magnetic commutatorless switched electric machine or a rotary part of the reluctance electric machine of the switched DC electric machine with conduction ring and brush (1000), and an electric conduction ring and brush device (107) is served as an interface for transmitting the electric power, thereby inputting the excitation electric power to the auxiliary excitation winding set; and through controlling the value and the polarity of excitation voltage and current, the magnetic pole of the rotary part of magnet-motive electric machine (104) of the switched DC electric machine with conduction ring and brush (1000) can be performed with the excitation effect of auxiliary excitation or differential excitation or auxiliary compound excitation or differential compound excitation.

DESCRIPTION OF MAIN COMPONENT SYMBOLS

Figure 1:
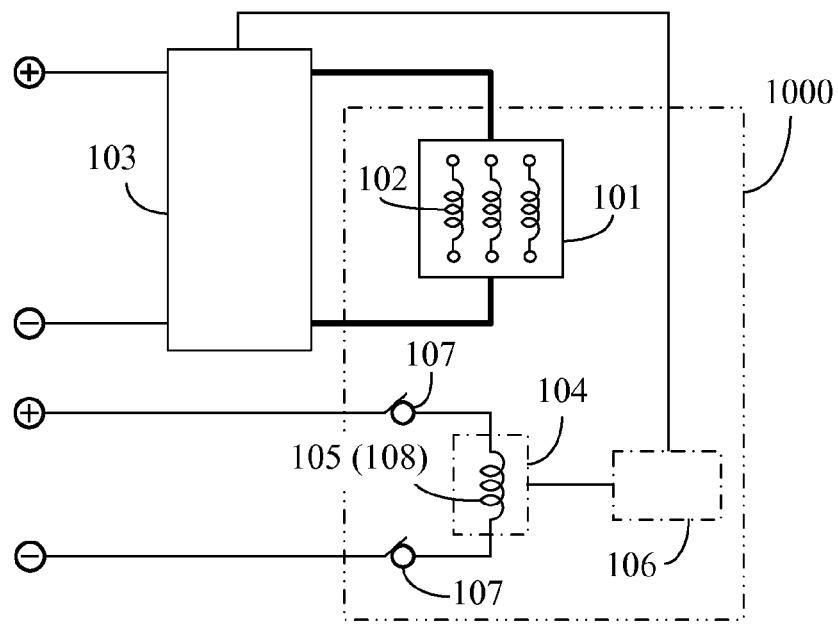
FIG. 1 is a schematic view showing the main electric circuit layout of the switched DC electric machine with conduction ring and brush (1000) having auxiliary excitation winding set, according to the present invention.

101: Magnetic field structure of electric machine
102: Magnetic field winding set of electric machine
103: Drive control device
104: Rotary part of electric machine
105: Serial type auxiliary excitation winding set
106: Electric machine angular position sensor
107: Electric conduction ring and brush device
108: Parallel type auxiliary excitation winding set
1000: Switched DC electric machine with conduction ring and brush

DETAILED DESCRIPTION OF THE PREFERRED EMBODIMENTS

The present invention provides an auxiliary excitation winding set to be installed at the rotary part of the electric machine (104) composed of a rotary part of the permanent magnetic commutatorless switched electric machine or a rotary part of the reluctance electric machine of the switched DC electric machine with conduction ring and brush (1000), and an electric conduction ring and brush device (107) is served as an interface for transmitting the electric power, thereby inputting the excitation electric power to the auxiliary excitation winding set; and through controlling the value and the polarity of excitation voltage and current, the magnetic pole of the rotary part of magnet-motive electric machine (104) of the switched DC electric machine with conduction ring and brush (1000) can be performed with the excitation effect of auxiliary excitation or differential excitation or auxiliary compound excitation or differential compound excitation;

The present invention provides a switched DC electric machine with conduction ring and brush having excitation winding set in which a rotary part of electric machine (104) composed of a rotary part of permanent magnetic commutatorless switched electric machine or a rotary part of reluctance electric machine of the switched DC electric machine with conduction ring and brush (1000) is installed with a serial type auxiliary excitation winding set (105) and/or a parallel type auxiliary excitation winding set (108), and an electric conduction ring and brush device (107) is served as an interface for transmitting the electric power; a drive control device (103) is used for controlling the value and the polarity and the phase sequence of excitation current of a magnetic field winding set of electric machine (102), and also equipped with one or more than one of following functions, including: (A) controlling the value and the polarity of excitation voltage and current of the serial type auxiliary excitation winding set (105); (B) controlling the value and the polarity of excitation voltage and current of the parallel type auxiliary excitation winding set (108); (C) controlling the value and the polarity of excitation voltage and current of both or one of the serial type auxiliary excitation winding set (105) and/or the parallel type auxiliary excitation winding set (108);

With the control function provided by the mentioned drive control device (103), and driven by the DC power source or DC power source rectified from the AC power source, when the switched DC electric machine with conduction ring and brush (1000) is operated as a motor or a power generator, the magnetic pole of the rotary part of electric machine (104) of the switched DC electric machine with conduction ring and brush (1000) can be performed with the excitation effect of auxiliary excitation or differential excitation through serial excitation, or auxiliary excitation or differential excitation through shunt excitation, or the excitation effect of auxiliary compound excitation or differential compound excitation.

Figure 2:
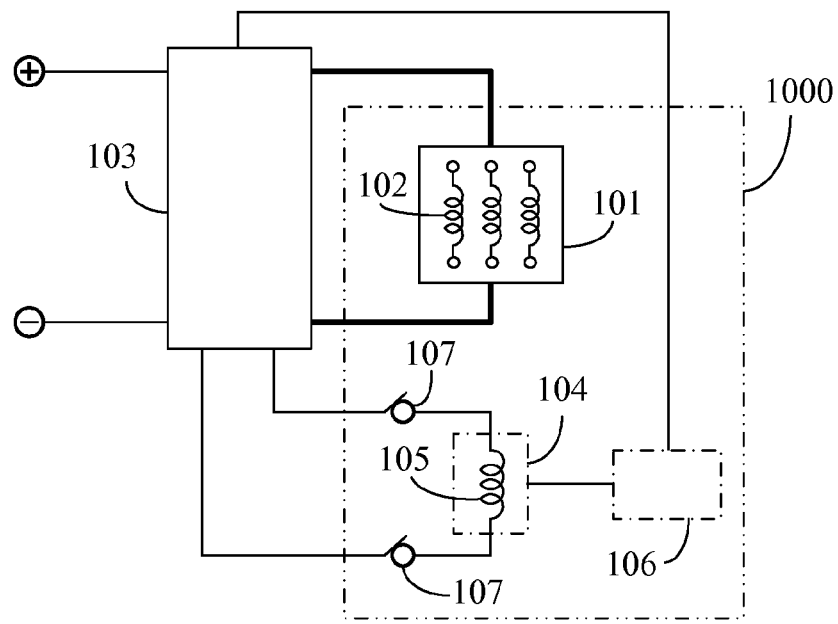
FIG. 2 is a schematic view showing the electric circuit layout of the switched DC electric machine with conduction ring and brush (1000) being installed with a serial type auxiliary excitation winding set (105), according to the present invention.
Figure 3:
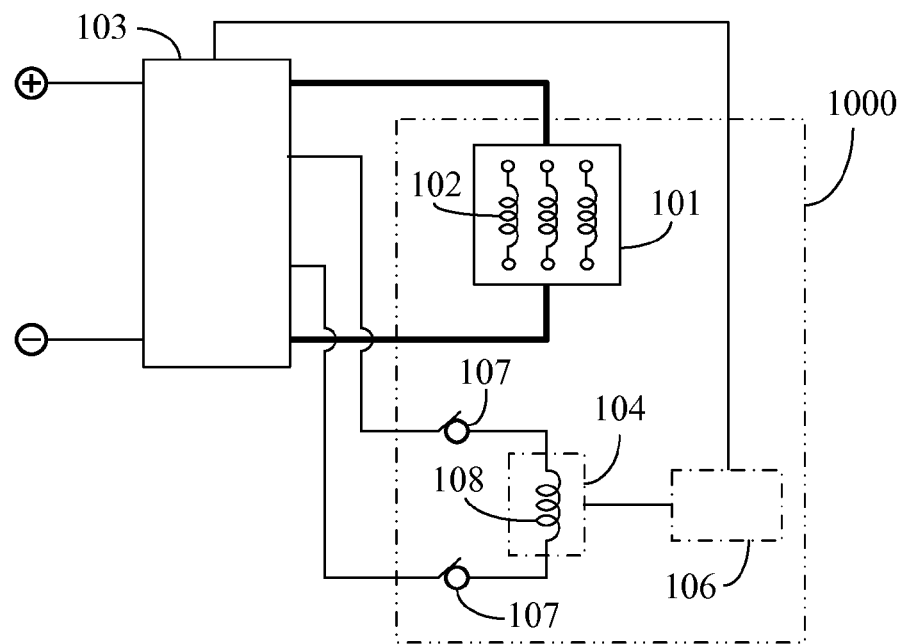
FIG. 3 is a schematic view showing the electric circuit layout of the switched DC electric machine with conduction ring and brush (1000) being installed with a parallel type auxiliary excitation winding set (108), according to the present invention.
Figure 4:
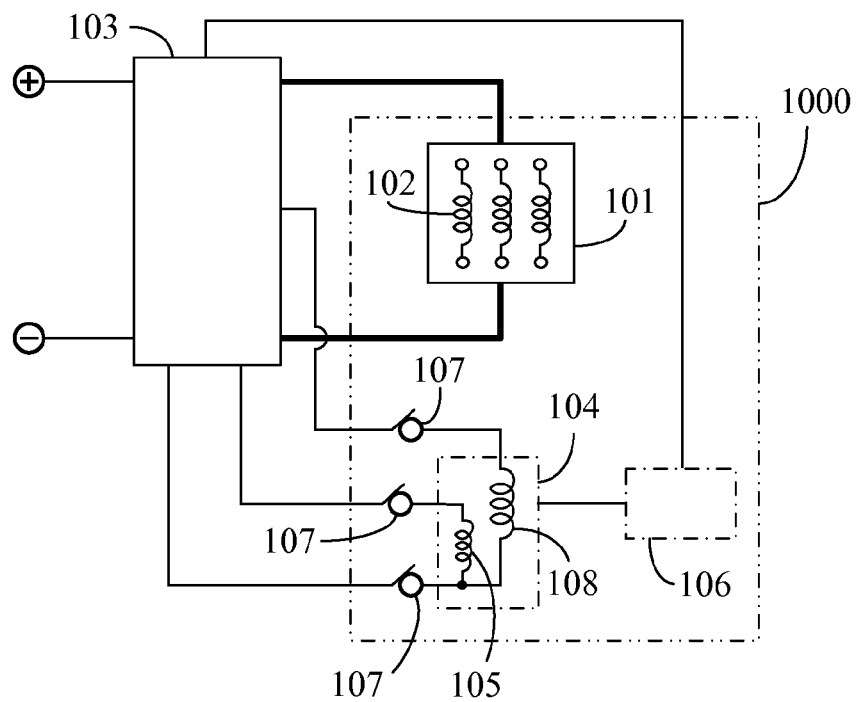
FIG. 4 is a schematic view showing the electric circuit layout of the switched DC electric machine with conduction ring and brush (1000) being installed with the serial type auxiliary excitation winding set (105) and the parallel type auxiliary excitation winding set (108), according to the present invention.

FIG. 1 is a schematic view showing the main electric circuit layout of the switched DC electric machine with conduction ring and brush (1000) having auxiliary excitation winding set, according to the present invention;

As shown in FIG. 1, it mainly consists of:
  drive control device (103): constituted by a drive electric control device composed of electromechanical components and/or solid sate components and/or microprocessors, served to receive signals from the electric machine angular position sensor (106), for controlling the timing, the polarity, the phase sequence and the value of voltage and current of the power supply excitation while the magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the serial type auxiliary excitation winding set (105) and/or parallel type auxiliary excitation winding set (108);
  magnetic field structure of electric machine (101): constituted by magnetic conductive iron cores and installed with the magnetic field winding set of electric machine (102) having two or more phases, coupled to the rotary part of electric machine (104), the magnetic loop formed by the magnetic field structure of electric machine (101) and the rotary part of electric machine (104) allows the shifting magnetic field of the field winding set of electric machine (102) to pass, thereby generating the electromechanical effect between the magnetic field structure of electric machine (101) and the rotary part of electric machine (104);
  magnetic field winding set of electric machine (102): constituted by a winding set installed in the magnetic field structure of electric machine (101) having two or more phases; controlled by the excitation control of the drive control device (103) while being operated as a motor, thereby generating magnetic fields with opposite shifting directions, and generating a motor actuation effect with the rotary part of electric machine (104); while being operated as a power generator, the magnetic field winding set of electric machine (102) is controlled by the drive control device (103) thereby controlling the voltage and current of outputting electric power;
  angular position sensor of electric machine (106): constituted by an electromechanical type switch, a Hall element or a physical location sensor such as photoelectron or electromagnetic induction, or ultrasonic or electrostatic induction; installed between the magnetic field structure of electric machine (101) and the rotary part of electric machine (104) which relatively revolve, thereby sensing the relative location relation between the shifting magnetic field generated by the magnetic field winding set of electric machine (102) of the magnetic field structure of electric machine (101) and the rotary part of electric machine (104), and sending the sensing signals to the drive control device (103);
  rotary part of electric machine (104): constituted by magnetic conductive materials, and installed with a rotation shaft and a housing, the characteristic is being coupled at a lateral side of the magnetic field structure of electric machine (101), provided with a salient pole structure having magnetic conductive feature and having the magnetic poles with the quantity same as or different from that of the magnetic field structure of electric machine (101), or having permanent magnetic pole and having the magnetic poles with the quantity same as or different from that of the magnetic field structure of electric machine (101), the characteristic is that the magnetic pole of the rotary part of electric machine (104) being installed with the auxiliary excitation winding set thereby transmitting the excitation electric power between the mentioned winding set and the exterior through the electric conduction ring and brush device (107);
  auxiliary excitation winding set: constituted by conductive wires wound on the magnetic pole of the rotary part of electric machine (104), and transmitting the electric power between the mentioned winding set and the exterior through the electric conduction ring and brush device (107), the installation means include installing one or both of the serial type auxiliary excitation winding set (105) and the parallel type auxiliary excitation winding set (108), wherein the serial type auxiliary excitation winding set (105) is through the electric conduction ring and brush device (107) for being connected in series with the electric power input end of the drive control device (103) having its output end served to drive and control the magnetic field winding set of electric machine (102) then leaded to the DC power source; the parallel type auxiliary excitation winding set (108) is connected in parallel with the DC power source or the output end of the drive control device (103) or two ends of the magnetic field winding set of electric machine (102);

electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the serial type auxiliary excitation winding set (105) and/or the parallel type auxiliary excitation winding set (108) and the exterior;

With the housing, the bearing or locking screws, the switched DC electric machine with conduction ring and brush (1000) can be assembled by the mentioned components, wherein the drive control device (103) can be co-structured with the switched DC electric machine with conduction ring and brush (1000) or separately provided;

FIG. 2 is a schematic view showing the electric circuit layout of the switched DC electric machine with conduction ring and brush (1000) being installed with a serial type auxiliary excitation winding set (105), according to the present invention;

As shown in FIG. 2, the electric circuit layout is as followings:

As shown in FIG. 2, the serial type auxiliary excitation winding set (105) is wound on the magnetic pole of the rotary part of electric machine (104), through the electric conduction ring and brush device (107) for being connected in series with the electric power input end of the drive control device (103) having its output end served to drive and control the magnetic field winding set of electric machine (102) then leaded to the DC power source, wherein the excitation polarity thereof and the magnetic pole of the rotary part include the auxiliary excitation with same polarity or the differential excitation with different polarities;

FIG. 3 is a schematic view showing the electric circuit layout of the switched DC electric machine with conduction ring and brush (1000) being installed with a parallel type auxiliary excitation winding set (108), according to the present invention;

As shown in FIG. 3, the electric circuit layout is as followings:

As shown in FIG. 3, the parallel type auxiliary excitation winding set (108) is wound on the magnetic pole of the rotary part of electric machine (104), and through the electric conduction ring and brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities;

FIG. 4 is a schematic view showing the electric circuit layout of the switched DC electric machine with conduction ring and brush (1000) being installed with the serial type auxiliary excitation winding set (105) and the parallel type auxiliary excitation winding set (108), according to the present invention;

As shown in FIG. 4, the electric circuit layout is as followings:

As shown in FIG. 4
the serial type auxiliary excitation winding set (105) is wound on the magnetic pole of the rotary part of electric machine (104), through the electric conduction ring and brush device (107) for being connected in series with the electric power input end of the drive control device (103) having its output end served to drive and control the magnetic field winding set of electric machine (102) then leaded to the DC power source, wherein the excitation polarity thereof and the magnetic pole of the rotary part include the auxiliary excitation with same polarity or the differential excitation with different polarities;

the parallel type auxiliary excitation winding set (108) is wound on the magnetic pole of the rotary part of electric machine (104), and through the electric conduction ring and brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities;

The negative terminal of the parallel type auxiliary excitation winding set (108) and the negative terminal of the serial type auxiliary excitation winding set (105) can be jointly connected thereby forming a long compound excitation connection, or the negative terminal of the parallel type auxiliary excitation winding set (108) is connected with the positive terminal of the serial type auxiliary excitation winding set (105) thereby forming a short compound excitation connection, the excitation polarity of the magnetic pole of the rotary part include the auxiliary excitation with same polarity or the differential excitation with different polarities.

The present invention provides a switch type DC electric machine having auxiliary excitation winding set and conduction ring and brush, which mainly comprises a magnetic field structure of the electric machine (101), a rotary part of the electric machine (104), an auxiliary excitation winding, an electric conduction ring and brush device (107), an electric machine angular position sensor (106) and a drive control device (103), wherein the rotary part of the electric machine (104) is composed of a rotary part of the permanent magnetic switched commutatorless electric machine or a rotary part of the reluctance electric machine; the auxiliary excitation winding is wound on the magnetic pole of the rotary part of the electric machine (104), so the electric conduction ring and brush device (107) is enabled to be served as an interface for inputting the excitation electric power to the auxiliary excitation winding set; and the drive control device (103) is served to control the timing, the polarity, the phase sequence, the voltage value and the current value for supplying electricity to each set of magnetic field winding set of electric machine (102) of the magnetic field structure of the electric machine (101) according to the signals sent by the electric machine angular position sensor (106), the auxiliary excitation winding set installed in the rotary part of the electric machine (104) includes a serial type auxiliary excitation winding set (105) or further includes both of the serial type auxiliary excitation winding set (105) and a parallel type auxiliary excitation winding set (108), and the electric conduction ring and brush device (107) is served as an interface for transmitting the electric power;

wherein the electric power is passed through the drive control device (103), the magnetic field winding set of electric machine (102) of the magnetic field structure of the electric machine (101), the electric conduction ring and brush device (107), further through the serial type auxiliary excitation winding set (105) then transferred to the other end of the power source via another electric conduction ring and brush device (107) thereby enabling the rotary part of the electric machine (104) to be provided with a function of serial excitation;

besides the serial type auxiliary excitation winding set (105) is wound on the rotary part of the electric machine (104), the parallel type auxiliary excitation winding set (108) can be additionally wound thereon, one end of the parallel type auxiliary excitation winding set (108) is leaded to one end of the power source through the electric conduction ring and brush device (107), and the other end of the parallel type auxiliary excitation winding set (108) is leaded to the other end of the power source through the another electric conduction ring and brush device (107), thereby being enabled to work with the mentioned serial type auxiliary excitation winding set (105) in the connected status to jointly allow the rotary part of the electric machine (104) to be provided with a electric machine function of generating long compound excitation; or through the electric conduction ring and brush device (107) and in a serial connecting manner, the parallel type auxiliary excitation winding set (108) is served to drive the drive control device (103) and two ends of the magnetic field winding set of electric machine (102) of the magnetic field structure of the electric machine (101), then connected in serial with the serial type auxiliary excitation winding set (105), so the serial type auxiliary excitation winding set (105) and the parallel type auxiliary excitation winding set (108) are enabled to be provided with a electric machine function of generating short compound excitation.

The invention claimed is:

1. A switch type DC electric machine (1000) having auxiliary excitation winding and conduction ring and brush, comprising:

a drive control device (103): constituted by a drive electric control device arranged to receive signals from a electric machine angular position sensor (106), for controlling the timing, the polarity, the phase sequence and the value of voltage and current of the power supply excitation when the magnetic field winding set (102) of a electric machine is operated as a motor, or controlling the timing, the polarity, the phase sequence and the value of voltage and current of outputting electric power when the magnetic field winding set of the electric machine is operated as a power generator; and controlling the voltage, the current and the polarity of excitation electric power passing a serial type auxiliary excitation winding set (105) and/or a parallel type auxiliary excitation winding set (108);

a magnetic field structure (101) of the electric machine: installed with the magnetic field winding set (102) having two or more phases, coupled to a rotary part (104) of the electric machine, the magnetic loop formed by the magnetic field structure (101) and the rotary part (104) allowing the shifting magnetic field of the magnetic field winding set (102) to pass, thereby generating an electromechanical effect between the field structure (101) and the rotary part (104);

the magnetic field winding set (102): constituted by a winding set installed in the magnetic field structure (101) having two or more phases; controlled by the excitation control of the drive control device (103) while being operated as a motor, thereby generating magnetic fields with opposite shifting directions, and generating a motor actuation effect with the rotary part (104); while being operated as a power generator, the magnetic field winding set (102) being controlled by the drive control device (103), thereby controlling the voltage and current of outputting electric power;

the angular position sensor (106): installed between the magnetic field structure (101) and the rotary part (104) which relatively revolve, thereby sensing the relative location relation between the shifting magnetic field generated by the magnetic field winding set (102) of the magnetic field structure (101) and the rotary part (104), and sending sensing signals to the drive control device (103);

the rotary part (104): constituted by magnetic conductive materials, and coupled at a lateral side of the magnetic field structure, the rotary part (104) being provided with a magnetically-conductive pole structure having a number of magnetic poles that is the same as or different from that of the magnetic field structure (101), or having a permanent magnetic pole and a number of magnetic poles that is the same as or different from that of the magnetic field structure (101), the characteristic is that the magnetic pole of the rotary part (104) being installed with the auxiliary excitation winding set to thereby transmit the excitation electric power between the mentioned winding set and the exterior through the electric conduction ring and brush device (107);

the auxiliary excitation winding set: wound on the magnetic pole of the rotary part (104), and transmitting the electric power between the mentioned winding set and the exterior through the electric conduction ring and brush device (107), wherein the serial type auxiliary excitation winding set (105) is connected in series through the electric conduction ring and brush device (107) with the electric power input end of the drive control device (103) having its output end serving to drive and control the magnetic field winding set (102), and then connected to the DC power source; and the parallel type auxiliary excitation winding (108) being connected in parallel with the DC power source or the output end of the drive control device (103) or two ends of the magnetic field winding set (102);

the electric conduction ring and brush device (107): respectively installed between the revolving rotary part of electric machine and the exterior, so that while the rotary part is revolving, the electric power is enabled to be transmitted between the serial type auxiliary excitation winding set (105) and/or the parallel type auxiliary excitation winding set (108) and the exterior.

2. A switch type DC electric machine having auxiliary excitation winding and conduction ring and brush as claimed in claim 1, wherein the serial type auxiliary excitation winding set (105) is wound on the magnetic pole of the rotary part (104), and through the electric conduction ring and brush device (107) is connected in series with the electric power input end of the drive control device (103) having its output end serving to drive and control the magnetic field winding set (102) and then connected to the DC power source.

3. A switch type DC electric machine having auxiliary excitation winding and conduction ring and brush as claimed in claim 1, wherein the parallel type auxiliary excitation winding set (108) is wound on the magnetic pole of the rotary part (104), and through the electric conduction ring and brush device (107) is connected in parallel with the power end of the drive control device (103);

the parallel type auxiliary excitation winding set (108) further being arranged to be connected in parallel with the output end after being controlled by the drive control device (103), thereby enabling the polarity, the excitation voltage and current to be individually controlled by the drive control device (103).

4. A switch type DC electric machine having auxiliary excitation winding and conduction ring and brush as claimed in claim 3, wherein a negative terminal of the parallel type auxiliary excitation winding set (108) and a negative terminal of the serial type auxiliary excitation winding set (105) are jointly connected, thereby forming a long compound excitation connection, or the negative terminal of the parallel type auxiliary excitation winding set (108) is connected with the positive terminal of the serial type auxiliary excitation winding set (105), thereby forming a short compound excitation connection.

5. A switch type DC electric machine having auxiliary excitation winding and conduction ring and brush as claimed in claim 1, wherein
the serial type auxiliary excitation winding set (105) is wound on the magnetic pole of the rotary part (104), and through the electric conduction ring and brush device (107) is connected in series with the electric power input end of the drive control device (103) having its output end serving to drive and control the magnetic field winding set (102), and then connected to the DC power source; and
the parallel type auxiliary excitation winding set (108) is wound on the magnetic pole of the rotary part (104), and through the electric conduction ring and brush device (107) is connected in parallel with the power end of the drive control device (103);
the parallel type auxiliary excitation winding set (108) further being arranged to be connected in parallel with the output end after being controlled by the drive control device (103), thereby enabling the polarity, the excitation voltage and current to be individually controlled by the drive control device (103).

6. A switch type DC electric machine having auxiliary excitation winding and conduction ring and brush as claimed in claim 5, wherein a negative terminal of the parallel type auxiliary excitation winding set (108) and a negative terminal of the serial type auxiliary excitation winding set (105) are jointly connected, thereby forming a long compound excitation connection, or the negative terminal of the parallel type auxiliary excitation winding set (108) is connected with the positive terminal of the serial type auxiliary excitation winding set (105), thereby forming a short compound excitation connection.

7. A switch type DC electric machine having auxiliary excitation winding and conduction ring and brush as claimed in claim 1, wherein a negative terminal of the parallel type auxiliary excitation winding set (108) and a negative terminal of the serial type auxiliary excitation winding set (105) are jointly connected, thereby forming a long compound excitation connection, or the negative terminal of the parallel type auxiliary excitation winding set (108) is connected with the positive terminal of the serial type auxiliary excitation winding set (105), thereby forming a short compound excitation connection.

* * * * *